May 21, 1963  L. F. CHAFFEE, JR  3,090,283
MULTIPLE START SCREW MACHINE

Filed March 19, 1958  4 Sheets-Sheet 1

INVENTOR.
LESTER F. CHAFFEE, JR
BY
*Lindsey and Pritzman*
ATTORNEYS

INVENTOR.
LESTER F. CHAFFEE, JR.
BY
Lindsey and Pretzman
ATTORNEYS

United States Patent Office 3,090,283
Patented May 21, 1963

3,090,283
MULTIPLE START SCREW MACHINE
Lester F. Chaffee, Jr., Coventry, Conn., assignor, by mesne assignments, to Sundstrand Corporation, a corporation of Illinois
Filed Mar. 19, 1958, Ser. No. 722,456
6 Claims. (Cl. 90—11.62)

This invention relates to a novel and improved multi-station metal working machine for cutting helical grooves in a work piece and more particularly to a novel and improved machine for cutting a multi-start screw.

A major object is to provide an improved semi-automatic machine which is equally adapted for sequentially feeding work pieces such as sleeves to a plurality of cutters in a novel manner rapidly and effectively to cause said cutters to define helical channels or grooves in the interior surface thereof, or for cutting external grooves in solid or hollow cylinders.

A further object is to provide a multi-start metal working machine with a novel and improved punching mechanism for automatically applying a reference mark to one end of the work piece to indicate the location of a spline or channel at the opposite end thereof as an aid to subsequent assembly of the finished part.

Other objects are to provide improved mechanism for automatically indexing a plurality of collets; for maintaining said collets positioned in pressure engagement with stop means during loading and cutting operations; and for relief of cutters during work retraction following a cutting operation, and for subsequently indexing the collets in a manner to reduce indexing drive power, hence impact forces, prior to the final positioning of the collets during each indexing operation.

A further object is to provide an improved control circuit and mechanism for the semi-automatic operation of a multiple start screw machine.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
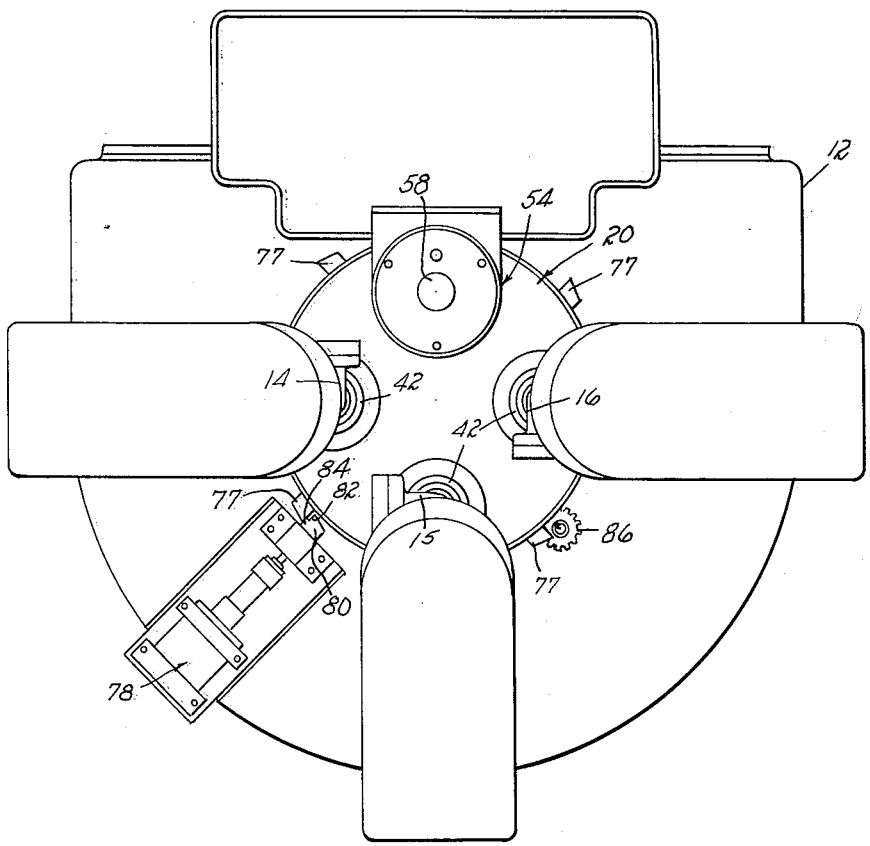
FIG. 1 is a top view of a machine embodying the present invention.
Figure 2:
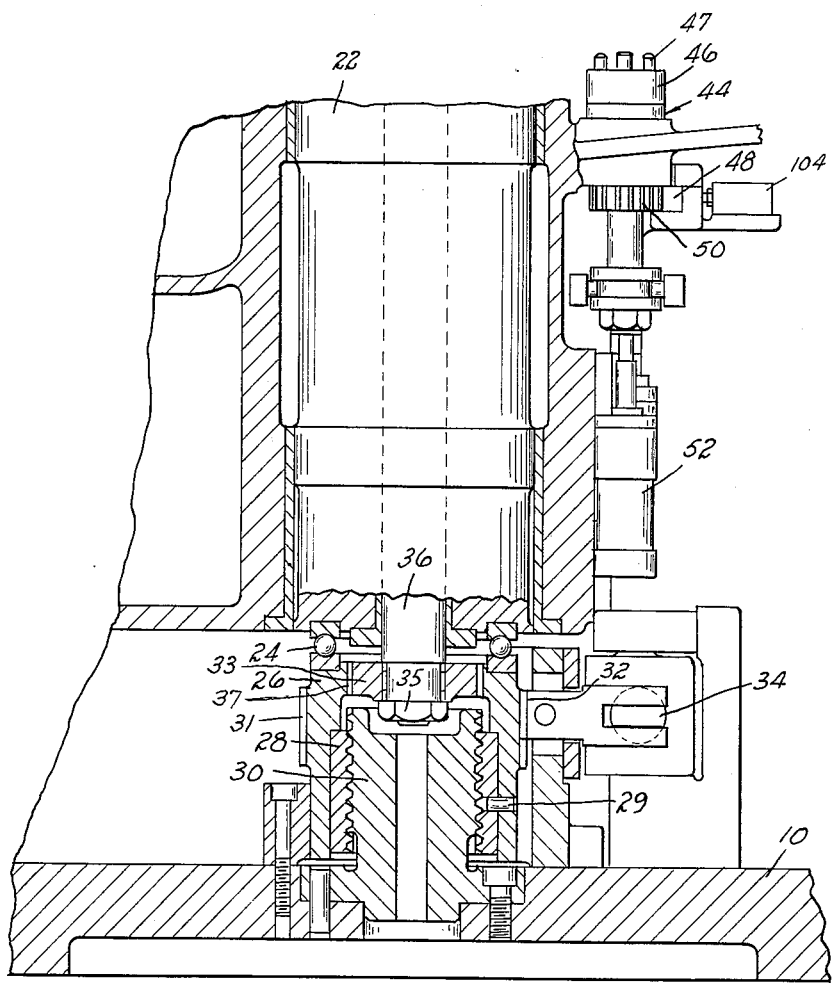
FIG. 2 shows a fragmentary vertical section the base of the machine of FIG. 1.
Figure 3:
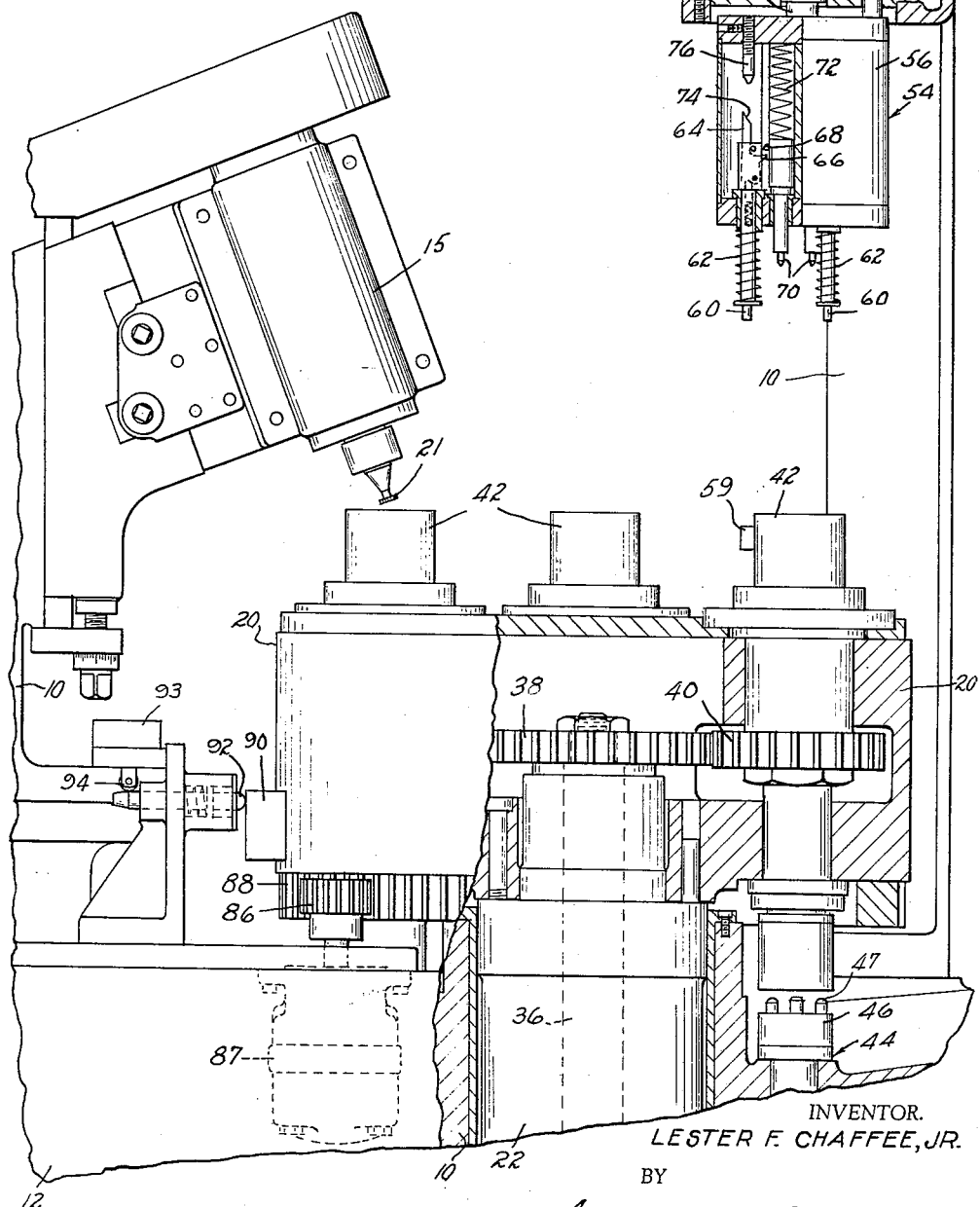
FIG. 3 is a fragmentary side elevation, partly in vertical section, of the upper part of the machine of FIG. 1 with two of the tool heads removed.

In FIGS. 1–3, a multi-start screw machine embodying the invention includes frame 10, enclosed by housing 12, supporting three tool heads 14–16 disposed in a semi-circle in ninety degree angularity about an indexable table 20. Each tool head carries a rotatable cutter 21 driven by a housed motor, not shown. Table 20 is fixed to the upper end of a spindle 22, journalled in frame 10 for both vertical reciprocation and rotation relative to the frame. The lower end of the spindle is supported on a thrust bearing 24 mounted on a sleeve 26 disposed coaxially of the spindle. A lead screw nut 28 is coaxially received within the lower end of the sleeve 26 in threaded engagement with a lead screw 30 fixed to the base 10. Sleeve 26 is doweled to nut 28 at 29 and is provided with elongated teeth 31 on its upper periphery providing a pinion gear engaged by a rack 32 slidably mounted to frame 10 and driven by piston 34 of a fluid motor 34a (FIGURE 4).

An elongated shaft 36, coaxially journalled in spindle 22, has its lower end connected to sleeve 26 by splined plug 33, bolted to shaft 36 by nut 35 and keyed to sleeve 26 at 37 for movement therewith and its upper end fixed to a sun gear 38 disposed coaxially within the table. The sun gear is engaged with four planet gears 40 fixed respectively to four collets or vises 42 rotatably supported on table 20 in vertical position and spaced in a semi-circle at ninety degree angularity about the axis of the spindle 22. The collets may be internally splined at the bottom thereof to hold certain types of work pieces fixed with respect to the collets during the cutting operation.

Referring to FIGURE 1, collets 42 are registerable with the tool heads 14–16 and also with a loading station located between the heads 14 and 16 and spaced ninety degrees from the heads 14 and 16. Four stop lugs 77 (FIGURES 1 and 4) are carried by the table in equiangular spaced relation around the periphery thereof. The lugs are engageable by a stop mechanism comprising a stop slide 80 having a stepped edge engageable with one of the lugs on the table to position the collets in alignment with the tool heads and punch mechanism.

Figure 4:
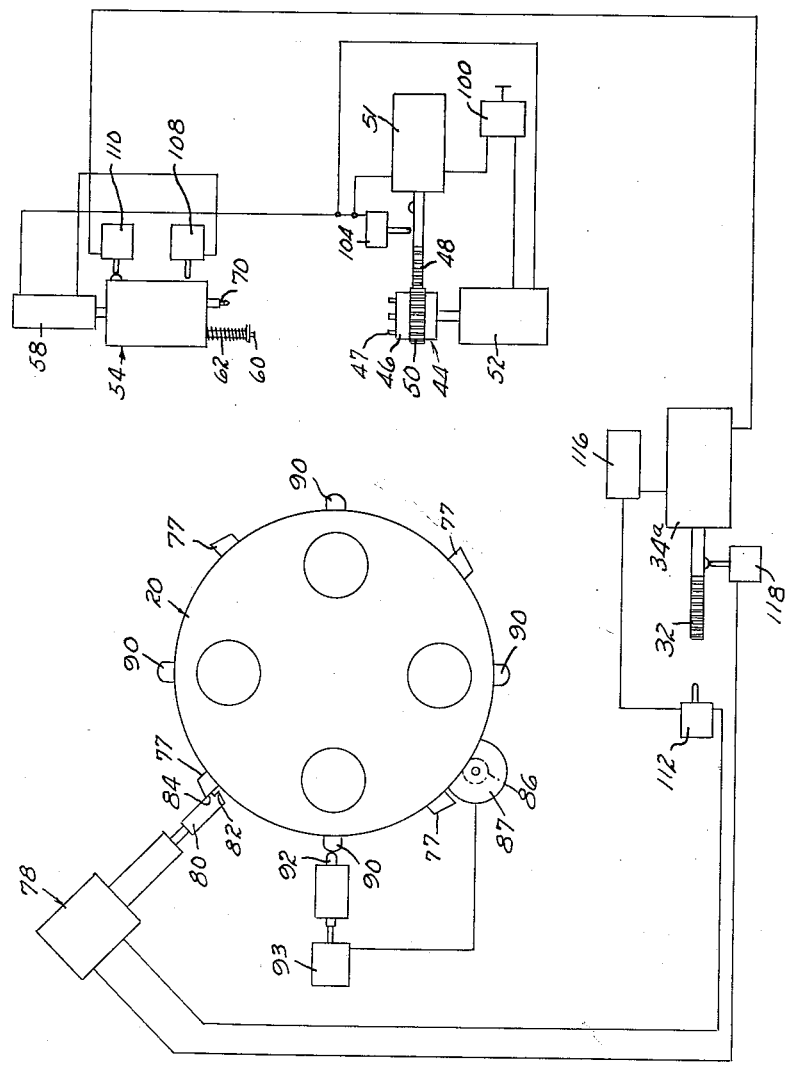
FIG. 4 shows diagrammatically the control circuit and apparatus of the machine of FIG. 1.

Stop slide 80, shown in FIGURES 1 and 4, is actuated by a commercially available three position hydraulic or air motor 78 which will selectively position the slide with the upper step 84 or the lower outer step 82 of the slide in lug engagement or will withdraw the slide completely out of lug engagement.

As illustrated in FIGURES 3 and 4 table 20 is rotated by a continuously operated stallable hydraulic motor 87 through a pinion 86 in mesh with a ring gear 88 mounted coaxially on the lower end of table 20. Four cams 90 are carried on the periphery of the table in approximate alignment with the collets and are engageable with a spring pressed plunger 92 mounted on the frame in approximate alignment with the tool head 15. Depression of plunger 92 cams roller 94 to actuate a valve 93 for the control of motor 87 to decrease momentarily the flow of high pressure oil into the motor for reduction of stopping impact forces. Cams 90 are angularly positioned relative to both table 20 and plunger 92 to effect motor controlling valve actuation just prior to engagement of each of the stop lugs 77 with the stop slide 80 substantially to reduce the force of engagement between the lugs and slide.

A collet actuator 44, illustrated in FIGURES 2 and 4, is fixed to the frame 10 in registry with a collet when located at the loading station and comprises a rotatably and reciprocably mounted actuating member 46 carrying pins 47 engageable with sockets, not shown, at the bottom of the aligned collet to rotationally open or close the jaws thereof. The actuating member is rotated by a rack 48 engageable with a gear 50 of the actuator member, the rack being driven by a hydraulic or air motor 51 in FIGURE 4. A hydraulic motor 52 on the frame 10 is connected to the actuating member 46 for axial movement thereof.

A punch mechanism 54 is supported on the frame in vertical alignment with a collet when in the loading station. A housing-like frame 56 is mounted on the end of a piston 57 of fluid motor 58 fixed in vertical position on frame 10. Three plungers 60, only two of which are shown in FIGURE 3, are slidably mounted to frame 56 in equiangular relation to the axis of a collet when in registry therebelow. A lug 59 is mounted to each collet to extend radially thereof, each lug being mounted circumferentially of its collet in the same angular relation to the internal work positioning spline therein and in a position of vertical alignment with one of the plungers 60 when in the loading station. As table 20 is rotatably indexed between each of the four stations (loading and cutting) the collets are rotated 120° by their planet gears, in mesh with the sun gear which remains stationary during the indexing operation. Each collet leaving the loading station is thus rotated one third of a turn upon arrival at the first and at subsequent cutting stations, hence the cuts are automatically spaced 120° part. However, as each collet returns to the loading station, it has undergone a total rotation of 1⅓ turns, since there are four stations. The collet spline is therefore rotated 120° from its former position in the loading station, hence when reloaded, the next uncut work piece blank is angularly displaced in respect to the prior blank by that angle.

Lug 59 of each collet is positioned in the same angular relation to the internal spline therein which positions the work piece, and there are three possible positions, due to the driving gear ratios, in which lug 59, hence the spline, may come to rest at the loading station. Any one of those positions is of course repeated on each third revolution of table 20. Punches 70, each operable by one of plungers 60, as described below, are geometrically disposed in such a manner that regardless of which of the plungers 60 lug 59 is vertically aligned with, depression thereof by lug contact on the downstroke of device 54 results in the cocking and release of its associated punch 70 to mark the work piece in an identical angular position relative to the collet spline as an aid in properly positioning the finished part during an assembly operation.

Plungers 60 are biased downwardly by springs 62 and each carries at its upper end a pivoted trigger lever 64 having an arm 66 engageable with a shoulder 68 on an associated punch 70, the three such punches being reciprocably mounted on the frame in offset parallel relation to the plungers and urged downwardly by relatively strong springs 72. The upper end of each trigger lever is provided with an inclined cam surface 74 engageable with the rounded lower end of a rod 76 depending from the upper end of frame 56 to pivot the trigger lever out of engagement with the associated punch at the top of the plunger depression stroke for downward projection of the punch under urge of the associated compression spring 72.

The operation of the machine will now be described with reference to the control system of FIG. 4 and assuming, at the start of a cycle of operation, an open jawed collet in registry with the loading station and a work piece manually loaded therein. A starting control 100, connected to fluid motor 51, and to hydraulic motor 52 for rotating and axially advancing the collet actuator respectively, is actuated to bring collet actuator 44 into engagement with the open collet positioned at the loading station to close that collet. When rack 48 has advanced the required distance to close the collet, it actuates hydraulic pressure operated limit switch 104 connected in a manner to stop motor 51 and to reverse motor 52 for retraction of collet actuator 44. A known centering circuit, not shown, operated by the collet closing rack positions the rack after each stroke so that a full stroke is always available for closing but only ½ the stroke is available for opening. This is to insure ample stroke for gripping work pieces of varying size. Switch 104 simultaneously actuates motor 58 to move punch mechanism 54 downwardly to effect engagement with and depression of that plunger 60 which is aligned with the collet lug 59, as shown in FIGURE 3, with that plunger drawn into frame 56 against the urge of springs 62 to draw the associated punch 70 upwardly against its spring 72. Engagement of trigger lever cam surface 74 with its aligned rod 76, releases the punch which springs downwardly under considerable urge from spring 72 to engage and mark the work piece in the desired angular position in respect to the spline. When the punch mechanism reaches its lower limit of travel, it engages limit switch 108 to reverse motor 58 and retract the punch mechanism. On full retraction, the punch mechanism closes another limit switch 110 to actuate the air motor 34a, powering the rack 32 to rotate pinion sleeve 26 and lead nut 28 and thus raise the spindle and table while simultaneously rotating the sun gear 38 with resultant rotation of the collets.

The work pieces in the collets will thus be simultaneously raised and rotated relative to the cutters 21 on the tool heads to cut a helical groove of predetermined accurate configuration in each work piece aligned with the tool heads. When the lead nut rack 32 reaches its limit of advance, it engages a limit switch 112 connected to the three position table stop slide mechanism 78 to retract the slide 80 partially whereupon the continuously operating table drive motor 87 will rotate the table a few degrees away from the cutters until the stop engages the outer lower step 82 on the stop slide to permit clearance for easy withdrawal of the cutters. The limit switch 112 is also connected to a time delay control 116 which is in turn connected to the air motor 34 for the lead nut rack to effect retraction of the rack a predetermined time interval after actuation of the limit switch 112 to allow sufficient time for the work to be backed off from the cutters, during partial retraction of the stop slide 80, before the table is lowered. Upon full retraction of the rack 32, it engages another limit switch 118 connected to the stop slide mechanism 78 to further actuate that mechanism fully to retract the stop slide momentarily and permit the table to advance the next stop lug 77. Stop slide 80 automatically returns to position step 84 thereof in the path of travel of the advancing stop lug 77 before completion of that advance. Just prior to engagement of said next lug 77 with the stop slide to position the table for another cycle of operation of the machine, one of the cams 90 actuates valve 93 momentarily to decrease the flow of oil to the motor 87, thus reducing the forces of impact during that stop.

To briefly summarize operation of the multiple start screw machine, a workpiece is clamped in a collet 42 at the loading station by collet actuator 44. Punch mechanism 54 then marks the position of the workpiece in the collet. Table 20, on which collets 42 are mounted, is rotated by stallable hydraulic motor 87 until a table stop lug 77 engages stop slide upper step 84 to position the workpiece properly aligned below driven cutters 21. Table 20 is now raised upwardly and simultaneously collets 42 are rotated to move the workpiece through cutting engagement with cutters 21 to cut a helical groove in the side of the workpiece. Slide 80 retracts to permit table 20 to rotate slightly until table stop 77 engages the lower outer step 82 of the slide, moving the workpiece out of engagement with the cutter. Table 20 is now lowered. Thereafter slide 80 is momentarily retracted and table 20 is rotated until a following table stop lug 77 engages slide upper step 84 as previously described. Collet actuator 44 loosens the workpiece at the loading station for removal and insertion of a new workpiece.

While the drawings and above description illustrate a machine, the cutter heads of which are positioned for cutting helical grooves internally of hollow work pieces such as sleeves, it will be apparent to persons skilled in the art that the machine may be employed, without substantial modification, for cutting external grooves in either solid or hollow cylindrical work pieces. Various modifications of the inventive concepts herein taught will become readily apparent without departure therefrom, the scope of the invention being defined in the appended claims.

I claim:

1. In a multiple start screw machine, a plurality of fixed tool stations each provided with a depending rotatably driven cutter, a member mounted for indexed rotation in a plane below the cutters, a plurality of collets mounted on said member, means for indexing said collets in registry with said cutters, said means comprising a plurality of stops fixed to said member, a stop member fixed with respect to said tool stations in the direction of rotation of said member and slidably mounted for projection from a position outside the path of movement of said stops to a position of indexed engagement with one of said stops, means for simultaneously raising and rotating said collets when in said indexed position, and means for continuously maintaining said stops in pressure engagement with said stop member when said collets are in an indexed position.

2. In a three start screw machine, a frame, a loading station and three tool stations fixed to said frame in annular configuration and spaced 90 degrees apart, a table concentrically mounted below said stations for rotation in a horizontal plane, three spaced collets rotatably mounted to said table in semi-circular configuration at 90 degree angularity for registry with said stations, stops fixed to said table in 90 degree angularity, a stop member fixed to said frame for retractable engagement with said stops, fluid motor means continuously applying rotational forces to said table, means associated with said retractable stop member for indexing said table at said stations, and means for vertically raising said collets toward said cutters when in registry therewith while simultaneously rotating said collets in unison.

3. In a device of the character described, a frame, a hollow spindle journalled vertically within said frame, a shaft journalled axially within said spindle, a lead screw fixed to said frame below and coaxially of said spindle, a lead nut threaded to said screw, a sleeve-like pinion fixed to said nut and to the lower end of said shaft, a thrust bearing supported on said pinion for the rotational support of said spindle, a rack engaging said pinion for the rotation thereof, and drive means for the reciprocation of said rack, whereby said shaft is rotated and said spindle is simultaneously raised or lowered by the reciprocal movement of said rack.

4. The device of claim 3, including a table mounted to the upper end of said spindle, a plurality of collets mounted on said table for rotation about vertical axes, a planetary gear carried by each collet, and a sun gear fixed to the upper end of said shaft in driving engagement with said planetary gears.

5. The device of claim 3 including a plurality of stations fixed to said frame and positioned to permit said collets to be rotated into registry therewith, means for the registered rotation of said table, means for stopping said table in a position of registry of said collets and said cutters, and fluid pressure means for firmly maintaining said table engaged with the stop means with said collets in said registered position.

6. A multiple start screw machine having in combination a plurality of work stations each provided with a cutter, a horizontally rotatable table provided with a plurality of collets, means for rotationally indexing said table for registry of said collets with said cutters, means maintained in pressure engagement by a continuously operating pressure source for locking said table in an indexed position, drive means for non-rotationally raising and lowering said table while simultaneously rotating each individual collet, said drive means comprising a vertically disposed spindle supporting said table and having journalled therein a drive shaft provided at its upper end with a sun gear, planetary gears fixed to said collets and in mesh with said sun gear to be driven thereby, means for unitarily raising said spindle, table, collets, drive shaft and associated gears with attendant synchronous rotation of said collets, and means including a plurality of driven cutters disposed above said collets in vertical registry therewith for groove cutting engagement with work pieces clamped therein as said collets are raised toward said cutters.

References Cited in the file of this patent
UNITED STATES PATENTS

| | | |
|---|---|---|
| 1,096,257 | McClure | May 12, 1914 |
| 1,744,362 | Carter | Jan. 21, 1930 |
| 2,370,367 | Marsilius | Feb. 27, 1945 |
| 2,416,518 | Fields et al. | Feb. 25, 1947 |
| 2,416,749 | Grey | Mar. 4, 1947 |
| 2,493,206 | Okey | Jan. 3, 1950 |
| 2,566,243 | Nyquist | Aug. 28, 1951 |
| 2,618,337 | Heller | Nov. 18, 1952 |
| 2,652,750 | Lacy | Sept. 22, 1953 |
| 2,674,754 | Hale | Apr. 15, 1954 |
| 2,712,775 | Wilt | July 12, 1955 |
| 2,953,069 | Smith | Sept. 20, 1960 |
| 2,953,975 | Hoglund | Sept. 27, 1960 |